March 11, 1924.

W. BAUSCH ET AL

LENS

Filed Aug. 24, 1920

1,486,720

INVENTORS
**William Bausch
& Max Poser**

BY

THEIR ATTORNEY

Patented Mar. 11, 1924.

1,486,720

UNITED STATES PATENT OFFICE.

WILLIAM BAUSCH AND MAX POSER, OF ROCHESTER, NEW YORK, ASSIGNORS TO BAUSCH & LOMB OPTICAL COMPANY, OF ROCHESTER, NEW YORK, A CORPORATION OF NEW YORK.

LENS.

Application filed August 24, 1920. Serial No. 405,585.

*To all whom it may concern:*

Be it known that we, WILLIAM BAUSCH, a citizen of the United States, and MAX POSER, a citizen of Germany, who has declared his intention of becoming a citizen of the United States, both residing at Rochester, in the county of Monroe and State of New York, have invented certain new and useful Improvements in Lenses; and we do hereby declare the following to be a full, clear, and exact description of the same, reference being had to the accompanying drawings, forming a part of this specification, and to the reference numerals marked thereon.

This invention relates to lenses for illuminating projectors, particularly of the class used in connection with automobile headlights and has for its object to provide a lens adapted to prevent the projection of glaring rays above a predetermined level and to properly control and distribute the light rays laterally through a wide angle without material loss in intensity and without dangerous glare in order to secure adequate illumination of an area in the vicinity of the light source whereby it will fulfill the present requirements respecting automobile headlights. The invention consists in an improved construction which is well adapted to attain the objects mentioned and may be readily formed and polished, as will be pointed out hereinafter.

In the drawings.

Similar reference numerals throughout the several views indicate the same parts.

Figure 3:
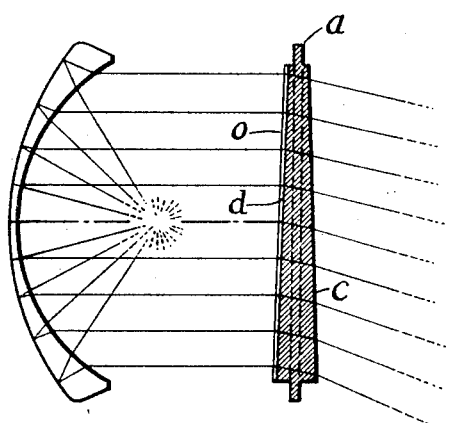
Figure 3 is a similar diagrammatic view taken in a vertical plane, the lens being shown in section indicated in Figure 1 by the line 3—3.

The lens as a whole is preferably composed of a single piece of suitable glass, and for convenience of application to an automobile projector casing, is provided with an annular rim or flange $a$ by which it is held in position. The lens may be pressed or moulded or ground and polished in any suitable manner. The general vertical section of the lens is prismoidal as shown in Figure 3 varying in thickness from top to bottom so that all the rays will be deflected downwardly, in order that when viewed from in front, no glaring rays will be reflected above a predetermined level, say 42 inches at 100 feet or 60 inches at 200 feet, as required by many of the present traffic laws. It is desirable that this vertical deflection of the rays be total and uniform and without stray light tending to dangerous or objectionable glare.

Figure 1:
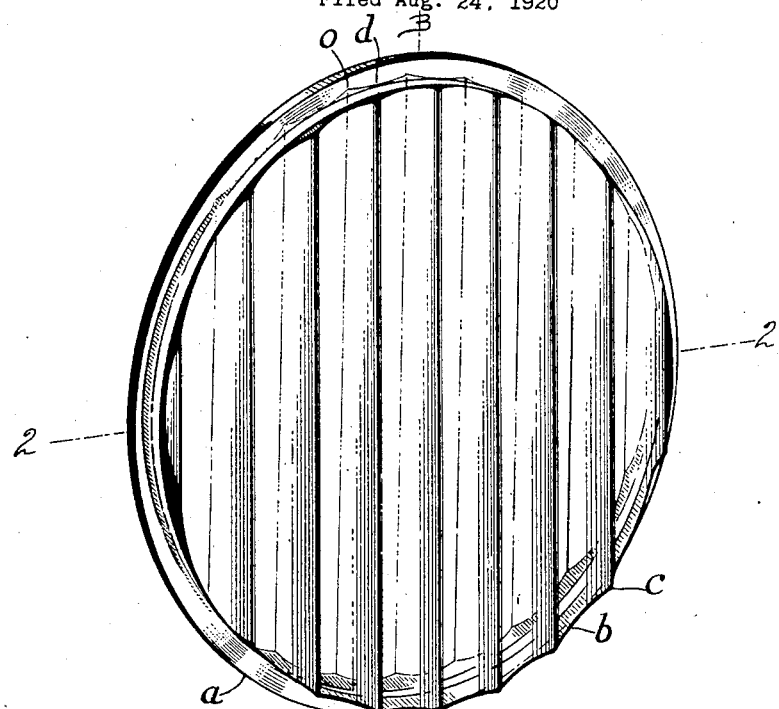
Figure 1 is a perspective view of a lens constructed in accordance with our invention and particularly adapted to that type of illuminating projector known as a headlight lamp such as are used on motor vehicles for illuminating the road.
Figure 2:
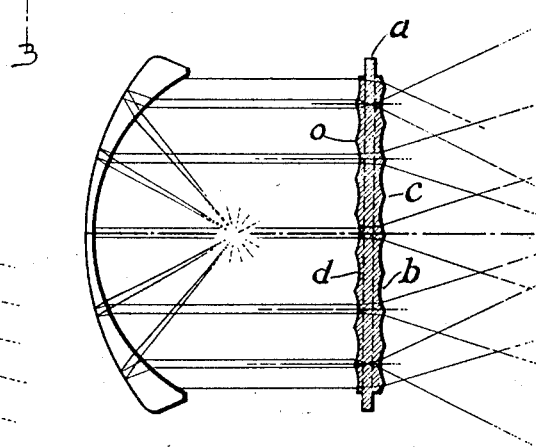
Figure 2 is a diagrammatic view taken in a horizontal plane through the center of an illuminating system of a projector of the head-light type, the lens being shown in section in the plane indicated in Figure 1 by the line 2—2.

In order that these conditions may be preserved and at the same time the proper lateral diffusion of the light accomplished, one or both of the surfaces of the lens is formed into a series of contiguous cylinder lenses of positive or negative form, meeting at the edges to form a sharp intersection between each pair and the axes of the cylinders extending approximately perpendicular to the base of the prism plane. In the present embodiment the anterior surface is provided with the cylindrical grooves $b$ the sharp line where the adjacent surfaces meet, being indicated by $c$. The posterior surface is formed with the concave cylindrical grooves, $d$, $o$ indicating the sharp line between adjacent ones. Preferably the intersecting lines $c$ and $o$ are arranged midway between those on the opposite surface and are arranged in the same flat plane whereby the refraction of the rays will be more uniform, the lens can be readily formed and there is less liability of breakage. When such a lens as this is placed in front of a suitable light source and a reflector for projecting the rays in parallel or approximately parallel lines, such as a Mangin mirror or a parabolic projecting reflector, the rays of light from the latter will traverse substantially the paths indicated in Figures 2 and 3, that is to say, the rays will be refracted downwardly and astigmatized by each of the cylindrical surfaces and spread sufficiently in a horizontal plane for side illumination.

Lenses such as described are found in practice to be admirably adapted for the purpose, producing maximum and correct illumination and by reason of the fact that the surfaces are practically continuous in at least one direction, they can be readily finished and polished to perfection, thus increasing their efficiency and facilitating their manufacture and cleansing. These lenses also by reason of their construction absorb the minimum of light rays and afford maximum illumination.

We have used the term prismoidal to define the general wedge shape of the vertical section of the lens as shown in Figure 3 which causes the deflection of the rays.

We claim as our invention:

1. A prismoidal refracting headlight lens of uniformly increasing thickness from top to bottom and having its entire incident and emergent surfaces uniformly continuous from apex to base, one of said surfaces being formed of a series of uniform contiguous astigmatizing cylindrical lenses with a dispersing power in the horizontal meridian only.

2. A prismoidal refracting headlight lens of uniformly increasing thickness from top to bottom and having its entire incident and emergent surfaces uniformly continuous from apex to base, both of said surfaces being formed of a series of uniform contiguous astigmatizing cylindrical lenses.

3. A prismoidal refracting headlight lens of uniformly increasing thickness from top to bottom and having its entire incident and emergent surfaces uniformly continuous from apex to base, each of said surfaces being formed with a series of uniform contiguous astigmatizing cylindrical grooves the edges of adjacent grooves on each face meeting intermediate those on the opposite face.

4. A prismoidal refracting lens of uniformly increasing thickness from top to bottom having its entire incident and emergent surfaces continuous from apex to base, one of said surfaces being formed of a series of uniform astigmatizing cylindrical lenses with the highest points of all of them arranged in a flat plane extending at a uniform angle to the axis of the lens as a whole.

WILLIAM BAUSCH.
MAX POSER.